United States Patent
Lee et al.

(10) Patent No.: US 10,999,899 B2
(45) Date of Patent: May 4, 2021

(54) HEATING CABLE HAVING EXCELLENT FLEX RESISTANCE AND FLEXIBILITY

(71) Applicant: LS CABLE & SYSTEM LTD., Anyang-si (KR)

(72) Inventors: Sang Il Lee, Seoul (KR); Do Hyun Park, Anyang-si (KR); Chang Suk Kim, Seoul (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 338 days.

(21) Appl. No.: 16/099,586

(22) PCT Filed: Apr. 21, 2017

(86) PCT No.: PCT/KR2017/004277
§ 371 (c)(1),
(2) Date: Nov. 7, 2018

(87) PCT Pub. No.: WO2017/198484
PCT Pub. Date: Nov. 23, 2017

(65) Prior Publication Data
US 2019/0254122 A1    Aug. 15, 2019

(30) Foreign Application Priority Data

May 16, 2016    (KR) .......... 10-2016-0059314
Jul. 5, 2016    (KR) .......... 10-2016-0084877

(51) Int. Cl.
*H05B 3/56*    (2006.01)
*C09K 21/12*    (2006.01)
(Continued)

(52) U.S. Cl.
CPC ............. *H05B 3/56* (2013.01); *C09D 177/00* (2013.01); *C09K 21/12* (2013.01); *H01B 1/02* (2013.01);
(Continued)

(58) Field of Classification Search
CPC .......... H05B 3/56; C09D 177/00; C09D 5/18; H01B 7/42; H01B 7/295; H01B 7/00;
(Continued)

(56) References Cited

U.S. PATENT DOCUMENTS 6,334,915 B1    1/2002    Ogura et al.
2002/0129969 A1*    9/2002    Groegl ............... H01B 7/041
174/128.1

FOREIGN PATENT DOCUMENTS

CN    202003716 U    10/2011
GB    2268643 A    1/1994
(Continued)

OTHER PUBLICATIONS

Chinese Notice of Allowance for related Chinese Application No. 201780029793.1; dated Apr. 15, 2020; (4 pages).
(Continued)

*Primary Examiner* — Shawntina T Fuqua
(74) *Attorney, Agent, or Firm* — K&L Gates LLP

(57) ABSTRACT

Provided is a heating cable having high flex resistance and flexibility. More particularly, the present invention relates to a heating cable having both an excellent mechanical property such as flex resistance and high flexibility which are in a trade-off relationship, and capable of facilitating control of heat to be generated.

7 Claims, 2 Drawing Sheets

(51) Int. Cl.
*H01B 3/30* (2006.01)
*H01B 7/29* (2006.01)
*C09D 177/00* (2006.01)
*H01B 7/42* (2006.01)
*H01B 5/08* (2006.01)
*H01B 7/295* (2006.01)
*H01B 7/00* (2006.01)
*H01B 1/02* (2006.01)

(52) U.S. Cl.
CPC ............... *H01B 1/026* (2013.01); *H01B 3/30* (2013.01); *H01B 5/08* (2013.01); *H01B 7/00* (2013.01); *H01B 7/29* (2013.01); *H01B 7/295* (2013.01); *H01B 7/42* (2013.01)

(58) Field of Classification Search
CPC ........ H01B 7/29; H01B 7/428; H01B 7/0045; H01B 7/292; H01B 5/08; H01B 1/02; H01B 1/026; H01B 3/302; H01B 3/30; C09K 21/12

See application file for complete search history.

(56) References Cited

FOREIGN PATENT DOCUMENTS

| | | | |
|---|---|---|---|
| JP | 2015130280 | A | 7/2015 |
| KR | 100336173 | B1 | 5/2002 |
| KR | 100649334 | B1 | 11/2006 |
| KR | 101549592 | B1 | 9/2015 |

OTHER PUBLICATIONS

International Search Report for related International Application No. PCT/KR2017/004277; dated Nov. 23, 2017;(5 pages).
Written Opinion for related International Application No. PCT/KR2017/004277; dated Nov. 23, 2017;(5 pages).

\* cited by examiner

HEATING CABLE HAVING EXCELLENT FLEX RESISTANCE AND FLEXIBILITY

CROSS-REFERENCE TO RELATED APPLICATIONS

The present application is a National Stage of International Application No. PCT/KR2017/004277, filed Apr. 21, 2017, which claims priority to Korean Application No. 10-2016-0059314, filed May 16, 2016 and Korean Application No. 10-2016-0084877, filed Jul. 5, 2016, the disclosures of which are incorporated herein by reference.

TECHNICAL FIELD

The present invention relates to a heating cable having high flex resistance and flexibility. More particularly, the present invention relates to a heating cable having both an excellent mechanical property such as flex resistance and high flexibility which are in a trade-off relationship, and capable of facilitating control of heat to be generated.

BACKGROUND ART

Generally, a heating cable generating heat from electricity supplied thereto is installed in seats of a vehicle or the like to protect a driver and a passenger from the cold. The heating cable has a structure, in which strands of heating wire manufactured by individually coating a plurality of conductor core wires with an insulating material are bunched in a bundle, wrapped with a covering material, and arranged in a zigzag fashion on a mounting surface made of flame retarded nonwoven fabric, thereby forming a planar heating element.

Such a heating cable should have excellent mechanical properties, such as tensile strength and flex resistance, to prevent damage thereto, when used in a seat of a vehicle or the like, from mechanical, chemical, or thermal stress due to the weight of a passenger and vibration of a vehicle. Furthermore, the flexibility of the heating cable should be high so that the strands of heating wire may be arranged in the zigzag fashion to form the planar heating element as described above.

However, when a different alloy element is added to copper (Cu) of the conductor core wires of the heating cable or heating wires are bunched in a bundle by twisting them at regular pitches in order to improve the mechanical properties, e.g., flex resistance, of the heating cable, the mechanical properties of the heating cable can be improved but the flexibility thereof may be reduced or the resistance of the conductor core wires may be increased. Accordingly, it may be difficult to control the amount of heat to be generated from the heating cable.

In detail, the temperature of heat generated from the heating cable applied to a seat of a vehicle or the like should be generally in a range of 70° C. or less. To this end, it is necessary to adjust a total resistance of the heating cable according to a current input thereto. To further control the total resistance of the heating cable, it is preferable to reduce cross-sectional areas of the conductor core wires by reducing the diameters thereof, and adjust the total resistance through control of the number of strands of the conductor core wires. However, when the diameters of the conductor core wires are reduced, the mechanical properties, such as tensile strength and flex resistance, of heating wires may deteriorate, thereby reducing workability. In contrast, when the diameters of the conductor core wires are increased to improve the mechanical properties, such as tensile strength and flex resistance, of the heating wires, the total resistance may be difficult to control and the flexibility of the heating cable may deteriorate.

Accordingly, a heating cable having both excellent mechanical properties such as flex resistance and high flexibility which are in the trade-off relationship, and capable of facilitating control of heat to be generated is in urgent demand.

DETAILED DESCRIPTION OF THE INVENTION

Technical Problem

The present invention is directed to a heating cable having both excellent mechanical properties, such as tensile strength and flex resistance, and high flexibility which are in the trade-off relationship.

The present invention is also directed to a heating cable capable of facilitating control of heat to be generated.

Technical Solution

According to an aspect of the present invention, there is provided a heating cable comprising: a plurality of heating wires each including a conductor core wire and an insulating layer covering the conductor core wire; and a sheath part configured to cover the plurality of heating wires, wherein the plurality of heating wires are twisted and bunched in a bundle, the conductor core wire comprise a copper alloy, the copper alloy comprises magnesium (Mg) as an alloy element, as well as copper, and the conductor core wire has a yield stress of 700 to 1200 MPa and a fracture stress of 900 to 1400 MPa.

According to another aspect of the present invention, there is provided the heating cable, wherein the conductor core wire satisfy a condition of the following Equation 1:

$$0.285 \leq [\{(109.27 \times \ln(m) + 1331.2) \times (-135.92 m^2 + 527.09 m + 689.51)\}/(2.3 \times 10^7)] \times R \leq 3.10, \quad \text{[Equation 1]}$$

wherein m represents a content (wt %) of the magnesium (Mg), based on the total weight of the conductor core wire, and R represents a resistance (Ω/m) per unit length of the conductor core wire.

According to another aspect of the present invention, there is provided the heating cable, wherein the content of the magnesium (Mg) is in a range of 0.02 to 2.0% by weight, based on the total weight of the conductor core wire.

According to another aspect of the present invention, there is provided the heating cable, wherein the heating wires are bunched by being twisted at pitches of 1 to 20 mm.

According to another aspect of the present invention, there is provided the heating cable, wherein the number of the heating wires is in a range of 12 to 50.

According to another aspect of the present invention, there is provided the heating cable, wherein a total diameter of the bunched heating wires is in a range of 0.3 to 0.6 mm.

According to another aspect of the present invention, there is provided the heating cable, wherein the sheath part has an internal diameter of 0.3 to 0.6 mm.

According to another aspect of the present invention, there is provided the heating cable, wherein the heating cable has a total external diameter of 0.5 to 1.5 mm and a total resistance of 0.25 to 3.0 Ω/m.

According to another aspect of the present invention, there is provided the heating cable, wherein the insulating layer is formed by coating with urethane varnish or polyester imide enamel, and has a thickness of 0.005 to 0.007 mm.

According to another aspect of the present invention, there is provided the heating cable, wherein there is an empty space between two adjacent heating wires arranged close to an inner surface of the sheath part and the inner surface of the sheath part.

According to another aspect of the present invention, there is provided the heating cable, wherein S defined in the following Equation 2 below is 0.3 or more:

$$S=B/A, \quad \text{[Equation 2]}$$

wherein B represents an area of the empty space between the two adjacent heating wires and the inner surface of the sheath part, and A represents an area of the empty space between the two adjacent heating wires and the inner surface of the sheath part when it is assumed that the inner surface of the sheath part has a perfect circular shape.

According to another aspect of the present invention, there is provided the heating cable, wherein the sheath part is configured to fill spaces between the heating wires, the sheath part being formed of a coating composition which is a mixture of polymer resin and a flame retardant, and having a thickness of 0.2 to 0.25 mm, wherein the polymer resin has a tensile strength or 35 to 85 MPa and a bending strength of 70 to 120 MPa.

According to another aspect of the present invention, there is provided the heating cable, wherein the polymer resin comprises polyamide 12 (PA12), polyamide (PA6), thermoplastic poly elastomer (TPE), or a combination thereof.

According to another aspect of the present invention, there is provided the heating cable, wherein the flame retardant comprises at least one selected from the group consisting of an organic phosphorus-based flame retardant, a melamine-based flame retardant, and a phosphate ester-based flame retardant, wherein a content of the flame retardant is in a range of 15 to 25% by weight, based on the total content of the coating composition.

According to another aspect of the present invention, there is provided the heating cable, further comprising a central tensile wire arranged around the heating wires.

According to another aspect of the present invention, there is provided the heating cable, wherein the central tensile wire comprises: at least one high tensile fiber selected from the group consisting of high tensile carbon fiber, high tensile glass fiber, and aramid fiber; and resin covering at least a portion of the at least one high tensile fiber.

Advantageous Effects

In a heating cable according to the present invention, a material, diameter, and total number of conductor core wires can be precisely controlled to improve both mechanical properties, such as flex resistance, and flexibility which are in the trade-off relationship, and the amount of heat to be generated can be easily controlled.

MODE OF THE INVENTION

Hereinafter, exemplary embodiments of the present invention will be described in detail. The present invention is, however, not limited thereto and may be embodied in many different forms. Rather, the embodiments set forth herein are provided so that this disclosure will be thorough and complete, and fully convey the scope of the invention to those skilled in the art. Throughout the specification, the same reference numbers represent the same elements.

Figure 1:
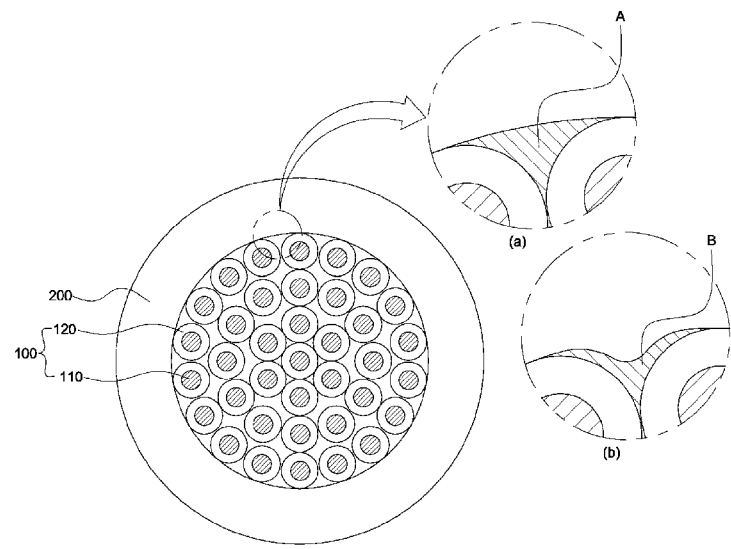
FIG. 1 is a schematic cross-sectional view of a heating cable according to an embodiment of the present invention.
Figure 2:
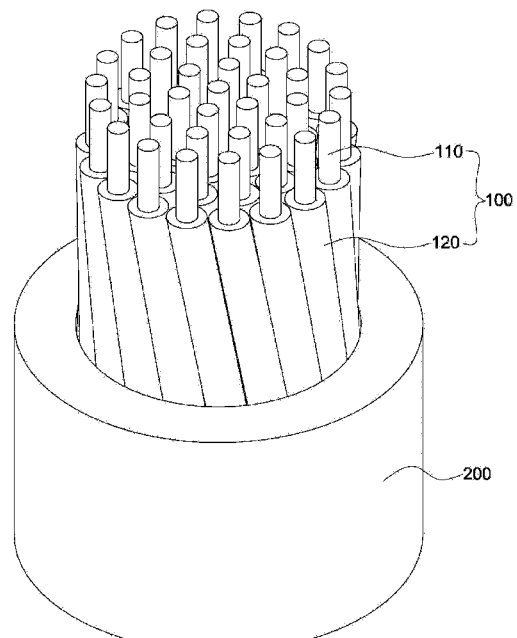
FIG. 2 is a longitudinal cross-sectional view of the heating cable of FIG. 1.

FIG. 1 is a schematic cross-sectional view of a heating cable according to an embodiment of the present invention. FIG. 2 is a longitudinal cross-sectional view of the heating cable of FIG. 1.

As illustrated in FIGS. 1 and 2, a heating cable according to an embodiment of the present invention may include a plurality of heating wires 100 which are bunched in a bundle and each of which includes conductor core wires 110 which are resistance wires generating heat when electricity is supplied thereto, and insulating layers 120 individually covering the conductor core wires 110; and a sheath part 200 covering the heating wires 100 bunched in the bundle.

Figure 3:
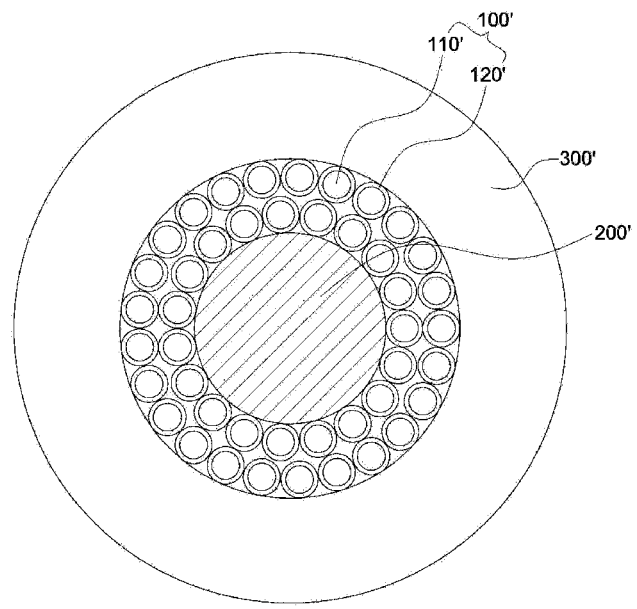
FIG. 3 is a schematic cross-sectional view of a heating cable according to another embodiment of the present invention.
Figure 4:
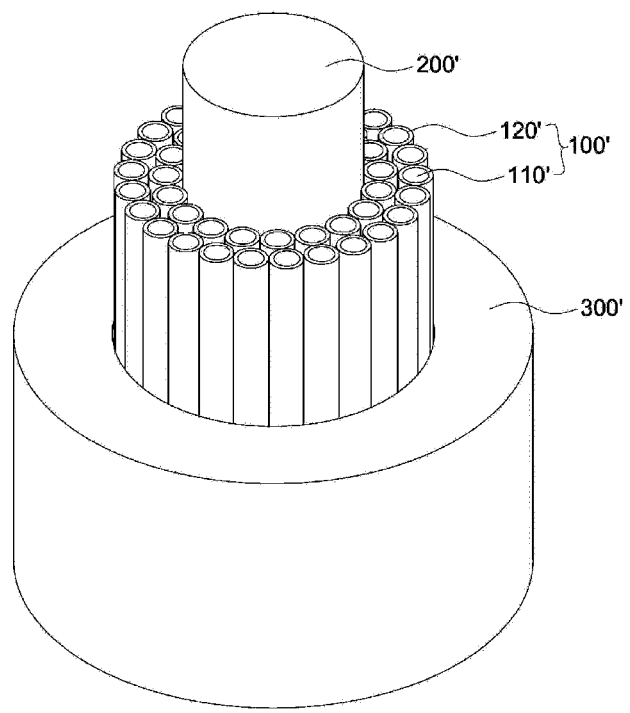
FIG. 4 is a longitudinal cross-sectional view of the heating cable of FIG. 3.

FIG. 3 is a schematic cross-sectional view of a heating cable according to another embodiment of the present invention. FIG. 4 is a longitudinal cross-sectional view of the heating cable of FIG. 3.

As illustrated in FIGS. 3 and 4, a heating cable according to another embodiment of the present invention may include a plurality of heating wires 100' which are bunched in a bundle around a central tensile wire 200' which will be described below and each of which includes conductor core wires 110' which are resistance wires generating heat when electricity is supplied thereto, and insulating layers 120' individually covering the conductor core wires 110'; the central tensile wire 200' which is provided at a center of the heating cable and around which the heating wires 100' are arranged; and a sheath part 300' covering the heating wires 100'.

The conductor core wire 110 or 110' may be formed of a copper alloy, and preferably, an oxygen-free copper (OFC) alloy. In the OFC alloy of the conductor core wire 110 or 110', the content of copper may be 99.99% by weight or more and thus the content of impurities excluding copper may be less than 0.01% by weight. Preferably, the content of copper may be 99.9999% by weight or more and the content of impurities excluding copper may be less than 0.0001% by weight.

The OFC alloy has a higher electrical conductivity than an existing copper alloy to which electrolytic copper is applied and thus a range of the content of the alloy element used therein may be increased. Thus, a composition ratio of an alloy element optimized for the heating cable may be established, and the OFC alloy has higher recrystallization temperature than that of the existing electrolytic copper alloy. Accordingly, the OFC alloy has excellent mechanical properties, such as tensile strength and flex resistance, at room temperature or when heated and thus a heating cable having stable quality may be achieved. Furthermore, the content of the impurities in the OFC alloy is lower than that of impurities in the existing electrolytic copper alloy, and thus, the heating cable may be prevented from being broken due to cracks occurring at a portion thereof overspread with impurities.

Here, the conductor core wire 110 or 110' may further include an alloy element, e.g., magnesium (Mg), nickel (Ni), tin (Sn), zinc (Zn), or silver (Ag), as well as copper, and preferably, OFC, and may preferably further include magnesium (Mg).

Magnesium (Mg) as the alloy element has a higher electrical conductivity than other alloy elements and thus the number of strands of the heating wire 100 may be minimized within a range in which a desired resistance of the heating wire 100 can be obtained, thereby additionally improving the flexibility of the heating wire 100 and reducing manufacturing costs.

The conductor core wire 110 or 110' may have a yield stress of 700 to 1200 MPa and a fracture stress of 900 to 1400 MPa. The flex resistance of the heating wire 100 may reduce when the yield stress and the fracture stress of the conductor core wire 110 or 110' are below standards, whereas the manufacturing costs of the heating wire 100 may increase when the yield stresses and the fracture stresses of the conductor core wire 110 or 110' exceed the standards.

A condition defined in Equation 1 below should be satisfied, so that the conductor core wire 110 or 110' may have the yield stress and the fracture stress falling within the above-described ranges and have a resistance appropriate for conductor core wires of the heating wire 100.

$$0.285 \leq [\{(109.27 \times \ln(m) + 1331.2) \times (-135.92m^2 + 527.09m + 689.51)\}/(2.3 \times 10^7)] \times R \leq 3.10 \quad \text{[Equation 1]}$$

In Equation 1 above, m represents the content (wt %) of the alloy element other than copper, and preferably the content (wt %) of magnesium (Mg), based on the total weight of the conductor core wire 110 or 110', and R represents a resistance (Ω/m) per unit length of the conductor core wire 110 or 110'.

Here, when the condition of Equation 1 above is not satisfied, the yield stress or the fracture stress of the conductor core wire 110 or 110' may decrease and thus the flex resistance of the heating wire 100 may decrease or the resistance of the conductor core wire 110 or 110' may increase. Accordingly, the total resistance of the heating wire 100 may be difficult to control and thus it may be extremely difficult to apply the conductor core wire 110 or 110' to the heating wire 100.

For example, in the conductor core wire 110 or 110', the content of magnesium may be in a range of 0.02 to 2.0% by weight, the content of nickel (Ni) may be in a range of 1.0 to 12.0% by weight, and the content of tin (Sn) may be in a range of 0.8 to 8.0% by weight, based on the total weight of the conductor core wire 110 or 110'.

When the content of each of the alloy elements is less than a minimum level or is greater than a maximum level, the mechanical properties, such as tensile strength and flex resistance, of the conductor core wire 110 or 110' may deteriorate and thus the heating cable may be broken due to external impacts or pressure, or a resistance of the heating wire 100 or 100' may increase and thus the number of conductor core wires 110 or 110' to obtain a desired resistance of the heating cable may increase. Accordingly, the flexibility of the heating cable may deteriorate and thus workability may reduce. The resistance of the heating cable may increase and the heating cable may be overheated unless the number of the heating wires 100 or 100' is increased, and thus it may be difficult to control the amount of heat to be generated.

The copper alloy is preferably free of precipitates, in which the alloy element is completely dissolved in a solid state in copper. That is, it is preferable that precipitates are not found continuously five times or more when a conductor core wire is made of the copper alloy and a precipitate is continuously detected in units of 1 cm from an arbitrary point on the conductor core wire. Since the copper alloy is free from precipitates, the heating cable may be prevented from being broken due to cracks at an interface between a precipitate and a metal matrix when the heating cable is repeatedly bent. Thus, the heating cable has high flex resistance.

A heating cable according to the present invention may have, for example, a resistance of 0.25 to 3.0 Ω/m to exhibit appropriate heating characteristics. The amount of heat generated may be insufficient when the resistance of the heating cable is less than 0.25 Ω/m, whereas a passenger of a vehicle may be scalded or a fire may occur due to excessive heat generation when the resistance of the heating cable is greater than 3.0 Ω/m.

In order to obtain an appropriate resistance of the heating cable, a diameter of the conductor core wire 110 or 110' may be in a range of about 0.02 to 0.07 mm, a resistance thereof may be in a range of about 10 to 40 Ω/m, and the total number thereof may be in a range of 12 to 50.

The resistance of the heating cable is determined by a total cross-sectional area of the conductor core wires 110 or 110' thereof, and thus, the diameter and the total number of the conductor core wires 110 or 110' may be inversely proportional to each other.

In detail, when the diameter of the conductor core wires 110 or 110' is less than 0.02 mm, the number of the conductor core wires 110 or 110' should be increased to obtain a desired resistance. In this case, the conductor core wires 110 or 110' are likely to be broken. In contrast, when the diameter of the conductor core wires 110 or 110' is greater than 0.07 mm, the number of conductor core wires 110 or 110' may be reduced to obtain the desired resistance but the flexibility of the heating cable may significantly deteriorate.

Preferably, the conductor core wire 110 or 110' may not be thermally treated. A general metal core wire has high strength and thus may be thermally treated to improve the flexibility thereof when bent. However, when the conductor core wire 110 or 110' is thermally treated, the tensile strength and flex resistance thereof may deteriorate. Thus, the conductor core wire 110 or 110' is not thermally treated to have high tensile strength and flex resistance, and the flexibility thereof may be additionally improved by reducing the diameter thereof as described above.

The insulating layers 120 or 120' suppress the heating cable from being locally excessively heated or the occurrence of a fire, caused when some of the conductor core wires 110 or 110' are broken due to external impacts or pressure. In detail, when the conductor core wires 110 or 110' are not covered with the insulating layers 120 or 120', i.e., when current flows through a broken conductor core wire 110 or 110' due to contact between a broken conductor core wire 110 or 110' and a non-broken conductor core wire 110 or 110', a resistance of a broken portion of the conductor core wire 110 or 110' increases due to a reduction in the total cross-sectional area of the conductor core wires 110 or 110'.

Accordingly, the heating cable may be locally excessively heated and thus a passenger or the like may be scalded or a fire may occur.

Accordingly, each of the conductor core wires 110 or 110' may be covered with the insulating layer 120 or 120' to prevent current from flowing through a broken conductor core wire 110 or 110', and thus, the heating cable may be prevented from being locally excessively heated due to an increase in a resistance of a broken portion of the conductor core wire 110 or 110'. Here, the insulating layer 120 or 120' may be formed of an insulating material having a melting point lower than a soldering temperature. For example, the insulating layer 120 or 120' may be formed by coating with polyurethane varnish which is advantageous for forming a thin film or by coating with polyester imide enamel which is superior to the coating with polyurethane varnish in terms of tensile strength, and a thickness of the insulating layer 120 or 120' may be, for example, in a range of about 0.005 to 0.007 mm.

Preferably, the flexibility of a heating cable according to the present invention may be improved by decreasing the diameter of the conductor core wires 110 or 110', and a reduction in the tensile strength thereof due to the reduction in the diameter of the conductor core wires 110 or 110' may be compensated for by forming the insulating layer 120 or 120' by coating with polyester imide enamel having high tensile strength.

In the present invention, the heating wires 100 or 100' formed by covering the surfaces of the conductor core wires 110 or 110' with the insulating layers 120 or 120' may be bunched as a whole or may be bunched in a bundle around the central tensile wire 200' to be described below. In particular, the heating wires 100 or 100' may be bunched by being twisted at regular pitches. Here, the pitches at which the heating wires 100 or 100' are twisted may be, for example, in a range of 1 to 20 mm.

When the pitches at which the heating wires 100 or 100' are twisted is excessively small, e.g., less than 1 mm, the flex resistance of the heating cable may be improved but productivity significantly decreases. In particular, the resistance of the heating wires 100 or 100' may significantly increase and thus the amount of heat to be generated may be difficult to control due to excessive heat generation, and the flexibility thereof may significantly deteriorate. In contrast, when the pitches at which the heating wires 100 or 100' are twisted are excessively large, e.g., greater than 20 mm, the flex resistance of the heating cable may be insufficient. The total diameter of the bunched heating wires 100 or 100' may be in a range of about 0.3 to 0.6 mm.

As illustrated in FIGS. 3 and 4, the heating cable according to the present invention may include the central tensile wire 200' at a center thereof. The central tensile wire 200' may improve the mechanical properties, e.g., tensile strength and flex resistance, of the heating cable, and may structurally stabilize the heating cable to have a uniformly round cross-section.

The central tensile wire 200' may include at least one high tensile member, e.g., high tensile fiber, and preferably, at least one high tensile member selected from the group consisting of high tensile carbon fiber, high tensile glass fibers, aramid fiber, etc. Alternatively, the plurality of high tensile members may be configured in a rod shape by impregnating or coating them with resin to suppress the high tensile members from protruding and exposed between the heating wires 100', thereby preventing deterioration of the flexibility of the heating cable, poor appearance of the heating cable, and non-uniform heat generation.

In the present invention, the bunched heating wires 100 or 100' are completely covered with the sheath part 200 or 300'. The sheath part 200 or 300' may uniformize a distribution of heat dissipation from a surface of the heating cable, and may protect the heating wires 100 or 100' from external impacts or pressure while stably fixing a structure of the bunched heating wires 100 or 100' even when an external force is applied to the heating wires 100 or 100' or the heating wires 100 or 100' are bent or twisted.

The sheath part 200 or 300' may be formed of a coating composition which is a mixture of polymer resin and a flame retardant. The polymer resin may have a tensile strength of 35 to 85 MPa and a bending strength of 70 to 120 MPa. For example, the polymer resin may be polyamide 12 (PA12), thermoplastic poly elastomer (TPE), or the like.

When the tensile strength of the polymer resin is less than 35 MPa, when the flame retardant is added in a large amount to add sufficient flame retardancy to the sheath part 200 or 300', the mechanical properties of the sheath part 200 or 300' may significantly deteriorate and thus cannot sufficiently protect the heating wires 100 or 100' from external impacts or pressure. In contrast, when the bending strength of the polymer resin exceeds 120 MPa, the flexibility of the heating cable may be insufficient.

The flame retardant may include a halogen-based flame retardant such as a bromine-based flame retardant or a chlorine-based flame retardant; an organic flame retardant such as an organic phosphorus-based flame retardant; or an inorganic flame retardants such as aluminum hydroxide, magnesium hydroxide, antimony trioxide, antimony oxide, a red phosphorous-based flame retardant, a boron-based flame retardant, a silica-based flame retardant, a melamine-based flame retardant, a phosphate ester-based flame retardant, or an inorganic phosphorus-based flame retardant.

However, when the flame retardant is the halogen-based flame retardant such as the bromine-based flame retardant or the chlorine-based flame retardant, environmental hormones such as dioxin are emitted when soldering or incineration for disposal, thereby causing environmental problems to occur and reducing workability. Thus, the flame retardant is preferably a halogen-free flame retardant, and more preferably, an organic and halogen-free flame retardant, such as the organic phosphorous-based flame retardant, the melamine-based flame retardant, or the phosphate ester-based flame retardant, when compatibility with the polymer resin is taken into account.

The content of the flame retardant may be in a range of 15 to 25% by weight, based on the total weight of the coating composition. When the content of the flame retardant is less than 15% by weight, the flame retardancy of the heating cable may be insufficient. When the content of the flame retardant is greater than 25% by weight, the mechanical properties of the sheath part 300 may excessively deteriorate. The sheath part 300 may have, for example, a thickness of about 0.2 to 0.25 mm, and thus, the total diameter of the heating cable may be in a range of about 0.5 to 1.5 mm.

As illustrated in FIGS. 1 to 4, the sheath part 200 or 300' may be extruded into a tubular shape at outer sides of the heating wires 100 or 100'. Thus, as illustrated in FIGS. 1A and 1B, there may be empty spaces A and B between two adjacent heating wires 100 or 100' and an inner surface of the sheath part 200 or 300'. According to process conditions applied to the extrusion of the sheath part 200 or 300', and particularly, a pressure condition, the inner surface of the sheath part 200 or 300' may form a perfect circle as illustrated in FIG. 1A or the sheath part 200 or 300' may be partially inserted into an empty space between two adjacent heating wires 100 or 100' as illustrated in FIG. 1B.

When the empty spaces A and B are narrow or there are no empty spaces, i.e., when spaces between the two adjacent heating wire 100 or 100' are overfilled with the sheath part 200 or 300', the heating wires 100 or 100' and the sheath part 200 or 300' may come into excessively close contact with each other and thus the flex resistance of the heating cable may deteriorate.

Accordingly, S defined in Equation 2 below may be 0.3 or more.

$$S=B/A \quad \text{[Equation 2]}$$

In Equation 2 above, B represents an area of an empty space between two adjacent heating wires 100 or 100' and the inner surface of the sheath part 200 or 300', and A represents an area of an empty space between two adjacent heating wires 100 or 100' and the inner surface of the sheath part 200 or 300' when the inner surface of the sheath part 200 or 300' forms a perfect circle.

Here, when S defined in Equation 2 above is less than 0.3, the sheath part 200 or 300' and the heating wires 100 or 100' may be in excessively close contact with each other and thus the flex resistance of the heating cable may sharply deteriorate.

A soldered part is formed at one end or both ends of the heating cable by dipping the one end or both ends of the heating cable into a solder bath so as to allow the heating wires 100 or 100' to carry electricity simultaneously. Electricity is supplied to the heating cable when the soldered part comes into contact with a connection terminal or the like. When the soldered part is formed, the sheath part 200 or 300' may not be completely melted in the solder bath and thus may remain on the soldered part. Thus, electricity is not likely to be smoothly conducted to the heating cable due to the remaining sheath part 200 or 300'. Accordingly, the soldered part is preferably formed after removing the sheath part 200 or 300'. When S defined in Equation 2 above is less than 0.3, the sheath part 200 or 300' may not be easily removed from the heating wires 100 or 100' or may remain on the heating wires 100 or 100' when removed from the sheath part 200 or 300', thereby causing poor contact between the heating cable and the connection terminal.

In addition, as described above, the total diameter of the bunched heating wires 100 or 100' may be in a range of about 0.3 to 0.6 mm, and the sheath part 200 or 300' may be formed to have an internal diameter corresponding to the total diameter of the bunched heating wires 100 or 100'. That is, the sheath part 200 or 300' may be formed to have an internal diameter of about 0.3 to 0.6 mm so as to facilitate the removal of the sheath part 200 or 300', thereby preventing poor contact between the heating cable and the connection terminal.

While exemplary embodiments of the present invention have been described herein, various modifications or changes may be made in the present invention by those of ordinary skill in the art without departing from the idea and scope of the present invention defined in the following claims. Accordingly, it is clear that all modifications are included in the technical scope of the present invention as long as they include the components as claimed in the claims of the present invention.

The invention claimed is:

1. A heating cable comprising:
   a plurality of heating wires each including a conductor core wire and an insulating layer covering the conductor core wire;
   a central tensile wire arranged around the heating wire, wherein the central tensile wire comprises: at least one high tensile fiber selected from the group consisting of high tensile carbon fiber, high tensile glass fiber, and aramid fiber; and resin covering at least a portion of the at least one high tensile fiber, and
   a sheath part configured to cover the plurality of heating wires, wherein the sheath part has an internal diameter of 0.3 to 0.6 mm,
   wherein the plurality of heating wires are bunched by being twisted at pitches of 1 to 20 mm in a bundle, the number of the heating wires is in a range of 12 to 50 wires, a total diameter of the bunched heating wires is in a range of 0.3 to 0.6 mm, and the heating cable has a total external diameter of 0.5 to 1.5 mm and a total resistance of 0.25 to 3.0 Ω/m,
   the conductor core wire comprise a copper alloy,
   the copper alloy comprises 0.02 to 2.0% by weight of magnesium (Mg) as an alloy element, based on the total weight of the conductor core wire, as well as copper, and the conductor core wire has a yield stress of 700 to 1200 MPa and a fracture stress of 900 to 1400 MPa, and the conductor core wire satisfies a condition of the following Equation 1:

$$0.285 \leq [\{(109.27 \times \ln(m)+1331.2) \times (-135.92m^2 + 527.09m+689.51)\}/(2.3 \times 10^7)] \times R \leq 3.10 \quad \text{[Equation 1]}$$

wherein m represents a content (wt %) of the magnesium (Mg), based on the total weight of the conductor core wire, and
   R represents a resistance (Ω/m) per unit length of the conductor core wire.

2. The heating cable of claim 1, wherein the insulating layer is formed by coating with urethane varnish or polyester imide enamel, and has a thickness of 0.005 to 0.007 mm.

3. The heating cable of claim 1, wherein there is an empty space between two adjacent heating wires arranged close to an inner surface of the sheath part and the inner surface of the sheath part.

4. The heating cable of claim 3, wherein S defined in the following Equation 2 below is 0.3 or more:

$$S=B/A \quad \text{[Equation 2]}$$

wherein B represents an area of the empty space between the two adjacent heating wires and the inner surface of the sheath part, and
   A represents an area of the empty space between the two adjacent heating wires and the inner surface of the sheath part when it is assumed that the inner surface of the sheath part has a perfect circular shape.

5. The heating cable of claim 1, wherein the sheath part is configured to fill spaces between the heating wires, the sheath part being formed of a coating composition which is a mixture of polymer resin and a flame retardant, and having a thickness of 0.2 to 0.25 mm,
   wherein the polymer resin has a tensile strength or 35 to 85 MPa and a bending strength of 70 to 120 MPa.

6. The heating cable of claim 5, wherein the polymer resin comprises polyamide 12 (PA12), polyamide (PA6), thermoplastic poly elastomer (TPE), or a combination thereof.

7. The heating cable of claim 5, wherein the flame retardant comprises at least one selected from the group consisting of an organic phosphorus-based flame retardant, a melamine-based flame retardant, and a phosphate ester-based flame retardant, wherein a content of the flame retardant is in a range of 15 to 25% by weight, based on the total content of the coating composition.

\* \* \* \* \*